No. 723,667. PATENTED MAR. 24, 1903.
A. GROSSMANN.
INCANDESCENT GAS BURNER.
APPLICATION FILED DEC. 23, 1902.

NO MODEL.

Witnesses:
William H. Stein
L. V. Sparks

Inventor;
Alfred Grossmann
By Willis Fowler.
Attorney.

UNITED STATES PATENT OFFICE.

ALFRED GROSSMANN, OF LEIPZIG, GERMANY.

INCANDESCENT GAS-BURNER.

SPECIFICATION forming part of Letters Patent No. 723,667, dated March 24, 1903.

Application filed December 23, 1902. Serial No. 136,337. (No model.)

*To all whom it may concern:*

Be it known that I, ALFRED GROSSMANN, merchant, a subject of the Prince of Schwarzburg-Rudolstadt, residing at 35¹ Kantstrasse, in the city of Leipzig, Germany, have invented new and useful Improvements in Incandescent Gas-Burners, of which the following is a specification.

My invention relates to a simple construction of incandescent gas-burners the gas-supply of which can be regulated in a simple manner.

According to my invention I use a burner in the base of which there is an aperture closed by cone. Around this aperture there are one or more supplemental gas-passages. I have found that this kind of known gas-burner does not fulfil the object which I have in view—namely, to regulate the heating-flame in such a manner that incandescent mantles of nearly any height may be used on the same burner. If, however, I modify such a burner in such a way that the openings through which the air passes into the mixing-tube are arranged in the horizontal plate which carries the mixing-tube or upon which the latter is fastened, so that the air has no deflection whatever, I am enabled to regulate the flame so that it will evenly lighten with a mantle of the common size or with a mantle of a double height and more.

Figure 1:
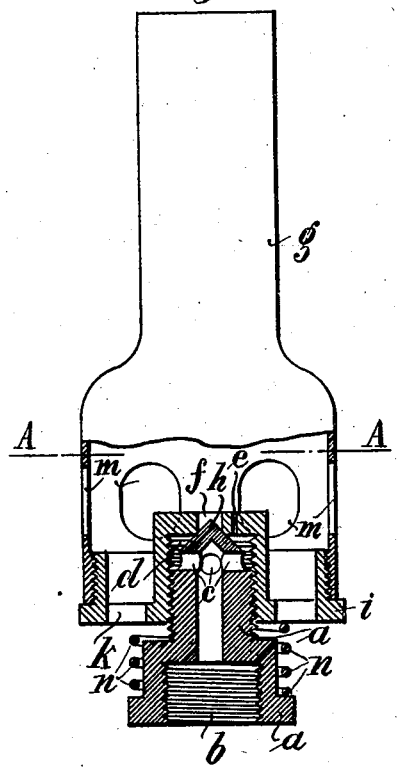
Figure 2:
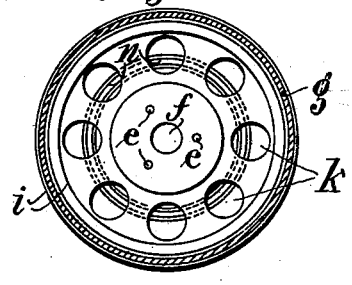

In the accompanying drawings, Figure 1 is an elevation of the mixing-tube, partly in section. Fig. 2 is the section in the direction of the line A A of Fig. 1.

In one example of a burner according to this invention the gas-nozzle $a$, which is provided with a thread $b$, by which it can be screwed upon a gas-bracket or the like, has an externally-screw-threaded upper portion, upon which is screwed an internally-threaded chamber and a closed upper end $h$, formed as a cone and having arranged around or near its base one or more lateral openings $c$ for the admission of gas to the interior of the chamber $d$. In the top of the chamber are a number of smaller apertures $e$, arranged in a circle around a larger central aperture $f$, which when the chamber is screwed upon the nozzle is more or less closed by the conical upper end $h$ of the nozzle. The smaller apertures $e$ are so fine that they do not in general supply a quantity of gas sufficient for a small burner.

The chamber $d$, as already stated, is internally threaded, so that it can be screwed upon the nozzle $a$, and it is combined with a plate $i$, which carries a Bunsen mixing-tube $g$. This plate has openings $k$, through which the air passes into the mixing-tube without being deflected. Additional lateral openings $m$ may be provided in the mixing-tube to admit further quantities of air; but this is generally unnecessary, as experience has proved that sufficient air is supplied through the openings $k$ in the plate $i$ already referred to. By the rotation of this plate $i$ the chamber $d$ is caused to rise or fall in relation to the nozzle $a$, and the cone $h$ is caused to regulate the opening of the larger aperture $f$ in the top of the chamber. The gas normally enters the mixing-tube not only through the smaller apertures $e$, but also through the larger aperture $f$, and by the rotation of the plate $i$ the quantity of gas passing through the larger aperture can be easily regulated. In order to avoid accidental rotation of this plate $i$, a spring $n$ is arranged between it and the nozzle and bears against them both.

It will easily be seen that the gas supplied to the mixing-tube will, as usual, be mixed therein with the air entering through the apertures in this tube before it passes to the head of the burner.

In case the burner is used for acetylene gas the incandescent-mantle may be directly arranged above the tube $g$, and no burner-head will be used.

It is essential that the point of the cone $h$ does not fully pass through the aperture $f$.

Having now particularly described and ascertained the invention, I declare that what I claim is—

1. An incandescent gas-burner provided with a gas and air mixing chamber having a gas-passage opening into the floor of said chamber and means for regulating the flow of gas through said passage, one or more supplemental gas-apertures located to one side of said gas-passage, and suitable air-inlets located in the bottom of said mixing-chamber for introducing the air in an upward direction, substantially as and for the purpose set forth.

2. An incandescent gas-burner having a gas-supply nozzle, a horizontal plate or member with an upwardly-extending gas-chamber adjustable vertically on said nozzle which introduces the gas therein and provided in its upper end with a gas-passage through which the gas is supplied to the mixing-chamber, a valve mounted upon said nozzle and coöperating with the said gas-passage to regulate the flow of gas through the same, a mixing-chamber located above said horizontal member and suitable air-inlets for supplying the air thereto, a spring arranged between the said horizontal member or plate and the said nozzle for preventing accidental rotation of said member, substantially as and for the purpose set forth.

3. An incandescent gas-burner provided with a gas and air mixing chamber having a gas-passage for supplying the gas to said chamber, a cone having its apex adapted to project into said gas-passage and the two said parts being relatively adjustable and so related that the apex of the cone is always below the upper end of said gas-passage to regulate the supply of gas, and one or more air-inlets for introducing air in an upward vertical direction into the mixing-chamber and at a point below the said gas-passage whereby there is practically no deflection of the air thus introduced into the mixing-chamber, substantially as and for the purpose set forth.

4. An incandescent gas-burner provided with a gas and air mixing chamber having a gas-passage for supplying the gas to said chamber, a cone having its apex adapted to project into said gas-passage and the two said parts being relatively adjustable and so related that the apex of the cone is always below the upper end of said gas-passage to regulate the supply of gas, and one or more air-inlets for introducing air in an upward vertical direction into the mixing-chamber and at a point below said gas-passage whereby there is no deflection of the air thus introduced into the mixing-chamber, and additional air-inlets located in the side of said mixing-chamber, substantially as and for the purpose set forth.

5. An incandescent gas-burner consisting in the combination of a gas-nozzle $a$, a valve mounted upon the upper end of said nozzle, a member $i$ provided with an upwardly-extending gas-chamber $d$ fitting over said nozzle and vertically adjustable thereon and having in the upper part of said gas-chamber a gas-passage $f$ and supplemental gas-apertures $e$, the said valve carried by the nozzle $a$ coöperating with the gas-passage to regulate the flow of gas, a mixing-chamber located above said member $i$, and suitable air-inlets for introducing the air into the lower part of said mixing-chamber, substantially as and for the purpose set forth.

6. An incandescent gas-burner consisting in the combination of a gas-nozzle $a$, a cone-valve $h$ mounted upon the upper end of said nozzle, a member $i$ provided with an upwardly-extending gas-chamber $d$ fitting over said nozzle and vertically adjustable thereon and having in the upper part of said gas-chamber a gas-passage $f$ with which the said valve on the upper end of said nozzle coöperates to regulate the flow of gas, a mixing-chamber located above said member $i$, and the said plate $i$ being provided with upwardly-extending openings $k$ for supplying air in a vertical direction to the said mixing-chamber whereby there is practically no deflection of the air thus introduced into the mixing-chamber, substantially as and for the purpose set forth.

7. An incandescent gas-burner comprising a gas-nozzle provided at its upper end with a cone, a mixing-tube provided with a bottom plate having a gas-passage therein and vertically adjustable on said nozzle, the said cone and gas-passage being so related that the apex of the cone is always below the upper end of said gas-passage, and one or more inlets in said bottom plate for admitting the air directly into said mixing-tube, substantially as and for the purpose set forth.

In testimony whereof I have signed my name to this specification in the presence of two subscribing witnesses.

ALFRED GROSSMANN.

Witnesses:
 PAUL E. SCHILLING,
 PAUL ARRAS.